United States Patent [19]
Maeda et al.

[11] 3,733,800
[45] May 22, 1973

[54] WINDING STEM BEARING ASSEMBLY FOR WATCHES

[75] Inventors: Katsutoshi Maeda, Ichikawa, Norio Kobayashi, Tokyo, both of Japan

[73] Assignee: Kabushiki Kaisha Daini Seikosha, Tokyo, Japan

[22] Filed: May 25, 1972

[21] Appl. No.: 256,989

[30] Foreign Application Priority Data

May 27, 1971 Japan.............................46/36460

[52] U.S. Cl. ............................................. 58/140 R
[51] Int. Cl. ................................................G04b 31/00
[58] Field of Search....................58/63, 73, 85.5, 58/140 R

[56] References Cited

UNITED STATES PATENTS 1,948,171  2/1934  Gisiger....................................58/63

FOREIGN PATENTS OR APPLICATIONS 120,029  8/1927  Switzerland...........................58/63

Primary Examiner—George H. Miller, Jr.
Attorney—Robert E. Burns & Emmanuel J. Lobato

[57] ABSTRACT

A winding stem bearing assembly for use in a watch having an injection molded plastic bearing made as an integral, unitary block with precision molded cavities therein for mounting components in the assembly. A winding stem is rotatably supported in an elongated cavity and a bearing pin and is retained with a part thereof housed in the bearing cavity by a bent part of a setting lever. A winding stem pinion is housed in a cavity in the bearing block and has a central opening through which the winding stem extends and is coupled thereto for joint rotation. A barrel and trainwheel bridge and plate are mounted on opposite sides of the bearing block which functions as their support and as a spacer. The bearing assembly requires no lubrication.

6 Claims, 8 Drawing Figures

PATENTED MAY 22 1973 3,733,800

WINDING STEM BEARING ASSEMBLY FOR WATCHES

BACKGROUND OF THE INVENTION

This invention relates generally to watches and more particularly to winding stem bearing assemblies for watches.

Conventional winding stem bearings have heretofore been made of metal. The bearings have been made as a plate requiring a multiplicity of drilling and milling operations for mounting a winding stem and a pinion thereon as well as other components. Moreover, the bearing surfaces required lubrication.

SUMMARY OF THE INVENTION

It is an object of the present invention to provide an improved winding stem bearing assembly which can be easily manufactured.

Another object is to provide a winding stem bearing assembly having no need of lubrication.

The winding stem assembly according to the invention has an injection molded plastic bearing block which is provided with recesses, cavities and bores accurately molded therein, for receiving and housing respective components of the assembly. An elongated cavity has sections of different axial lengths and different diameters or transverse dimensions for receiving a winding stem therein. The winding stem has axial portions of different diameters or transverse dimensions disposed in corresponding sections of the elongated cavity and extends axially outwardly thereof. A bridge and a plate are fixed to opposite sides of the bearing block and the bridge is provided with openings for receiving corresponding upstanding projections molded integral with the bearing block for positioning or locating thereof on the block. Another cavity or slot transverse to the cavity of the winding stem houses a pinion having a central opening through which the winding stem extends and is coupled to the pinion for rotating it.

The bearing block functions as a bearing for the winding stem and as a spacer for the bridge and plate mounted on opposite sides thereof. The bridge and plate are fixed to the bearing blocks by screws including screws threaded into an internally threaded sleeve that extends through the bearing block and is housed in a molded through hole or cavity.

The winding stem is provided with a circumferential collar or flange axially spaced from an axial portion of the winding stem having a major diameter. A setting lever disposed outwardly of the plate has a bent portion that extends through a cut-away on the plate into the cavity housing the winding stem and extends into an axial space between the collar of the winding stem and its portion of major diameter so that it functions as a keeper to retain the winding stem axially within the bearing block and it cannot fall out.

Other pins and levers are housed in respective openings or cavities and are held in place in an assembled state on the bearing.

BRIEF DESCRIPTION OF THE DRAWINGS

Other objects and advantages of the winding stem bearing assembly according to the invention will appear from the following description of an example of the invention, and the novel features will be particularly pointed out in the appended claims and drawings in which:

DESCRIPTION OF THE PREFERRED EMBODIMENTS

Figure 1:
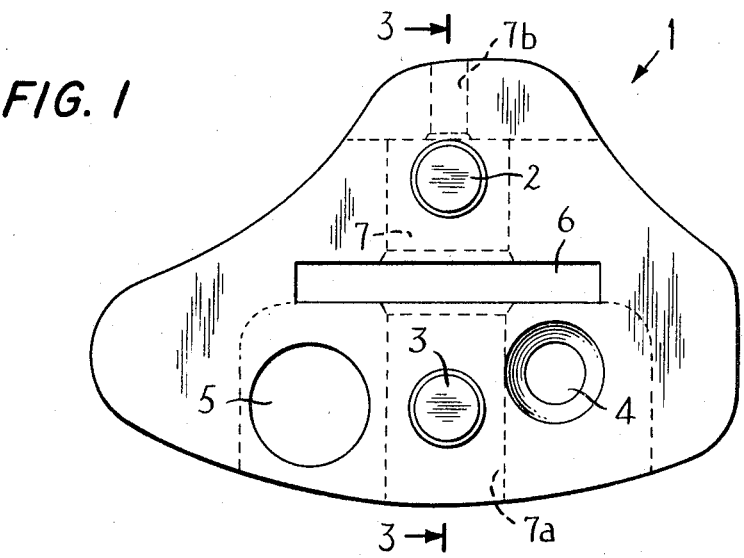
FIG. 1 is a plan view of a winding stem bearing according to the invention.
Figure 2:
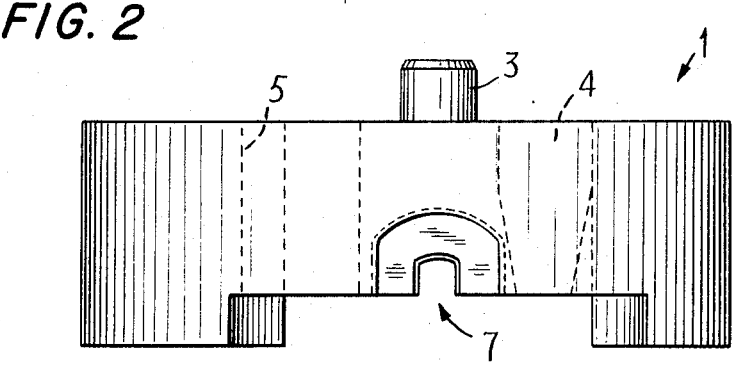
FIG. 2 is a side view of the bearing in FIG. 1.
Figure 3:
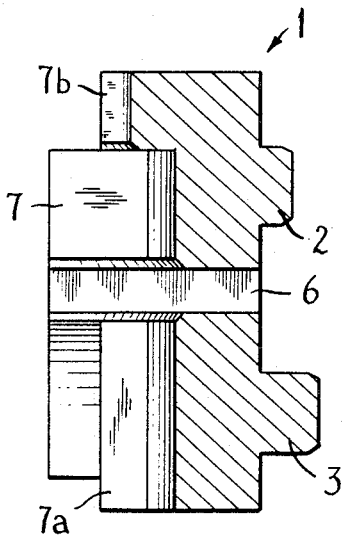
FIG. 3 is a cross section view taken along section line 3—3 of FIG. 1.

According to the drawings, a winding stem bearing or bearing block 1 is shown in FIGS. 1–3 and is made of plastic by injection molding. The bearing has two spaced upstanding projections which engage corresponding openings of a bridge as hereinafter described. The bearing has a tapered hole 4 and a mounting hole 5 with an elongated recess or cavity 7 transverse thereto. The cavity has a section 7a that is of larger transverse dimension then a section 7b.

The bearing hole 5 has an internally threaded sleeve 8 fitted therein with threads 8a at opposite ends for threading thereon threaded screws 9a,9b fixedly mounting thereon a barrel and trainwheel bridge 11 and a second plate 16 on opposite sides of the bearing which is held therebetween. The two projections 2,3 on the bearing are received in corresponding openings 12a and 12b on the barrel and train-wheel bridge 11 to properly align the bridge on the body of the bearing 1 so that various openings thereon, for example for the mounting screws can be aligned.

A tapered setting lever pin 13 is mounted in the tapered hole 4 of the bearing block or body 1. This pin 13 has a collar in the cavity or recess 7 intermediate its opposite ends which extend through the bridge 11 and the second plate 16 as shown in FIG. 7.

A winding stem 15 is rotatably mounted in the recess 7. The winding stem has a larger diameter axial section 15a within the portion 7a of the recess 7 and a minor diameter axial section 15b within portion 7b of the recess. An intermediate section of the winding stem of intermediate diameter is disposed between the other portions 15a,15b in the recess and has a collar 15c.

Figure 5:
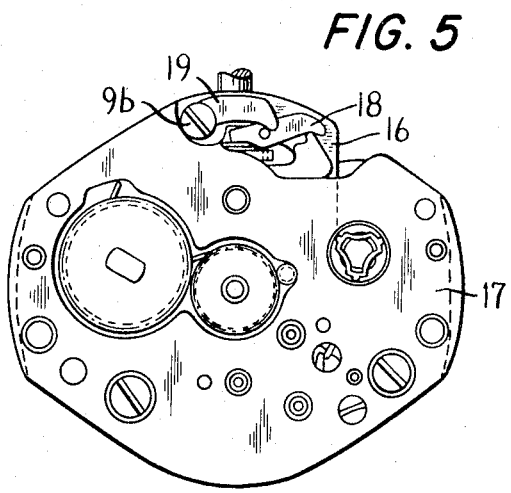
FIG. 5 is a plan view of a backside of the assembly in FIG. 4.

Another plate 17 is fixed to the second plate 16 by a bridge screw and has a configuration illustrated in FIG. 5.

Figure 6:
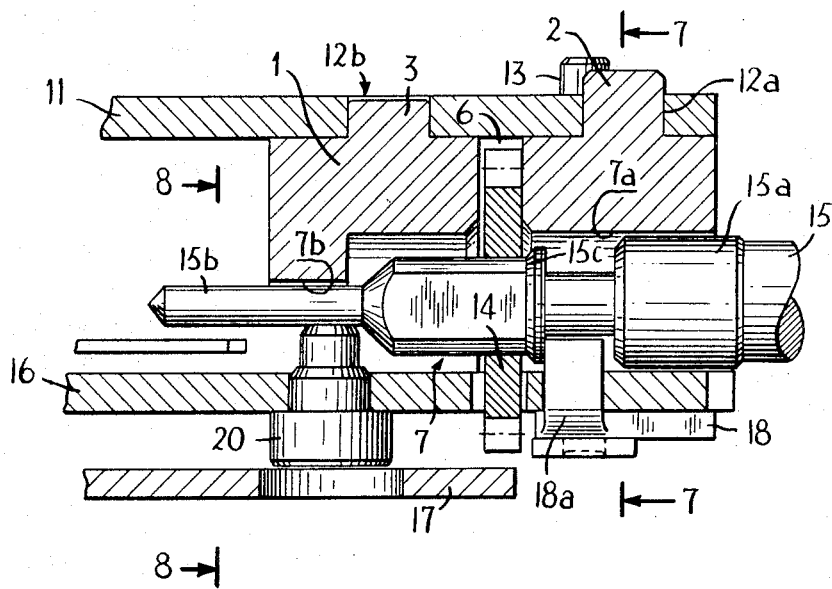
FIG. 6 is a fragmentary cross section view taken along section line 6—6 of FIG. 4.
Figure 7:
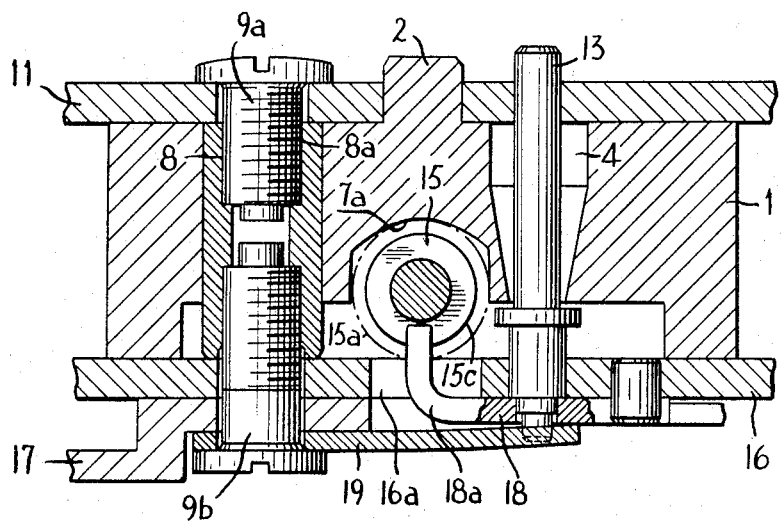
FIG. 7 is a fragmentary cross section view taken along section line 7—7 of FIG. 6.

A bent setting lever 18, shown in FIG. 7, has a straight portion underlying the second plate 16 under the setting lever pin 13 and has a bent portion 18a projecting through a cut-out 16a of the second plate 16 into the elongated cavity 7 and engages the collar 15c of the winding stem. This bent portion terminates between the flange 15c and the major diameter section 15a of the winding stem as shown in FIG. 6 and functions as a keeper to keep the winding stem axially in the bearing and it cannot fall out.

A bearing pin 20 pressed in the second plate 16 projects into the winding stem cavity along the reduced diameter section 7b and provides a bearing surface 20a for the section 15b of thinnest diameter on the winding stem 15 in conjunction with the section of the bearing block 1 that defines this reduced diameter section of the cavity for the winding stem.

The bearing assembly for the winding stem is assembled in the following steps:

1. The bearing block 1 has its two upstanding projections 2,3 pressed into corresponding openings 12a, 12b of the bridge 11. The bridge 11 is fixed to the bearing block 1 by a threaded screw or stud 21.

2. The mounting screw 9a is threaded into its mounting threaded sleeve 8.

3. The tapered setting lever pin is inserted in its tapered hole 4 and a winding pinion 14 is inserted in the groove 6.

4. The winding stem is inserted into its cavity 7 and through a central opening in the winding pinion 14. The winding stem and the pinion have complementary surfaces so that the pinion is rotationally driven by the winding stem when the stem is manually rotated during a winding operation.

5. The two plates 16,17 are mounted on the bearing. The outer plate 17 is fixed to the second plate 16 by a bridge screw not shown.

6. The setting lever 18 is inserted into the position with its bent portion 18a inserted through the cut-out 16a of the second plate 16 and its straight portion in contact with the setting lever pin 13 which extends below the second plate 16.

7. The plate mounting screw 9b is threaded into a threaded portion of the sleeve 8 and tightened. This screw is inserted through an opening on a setting lever holder 19 for holding in place the setting lever 18. When the screw is tightened the setting lever 18 and holder are held in position.

Figure 8:
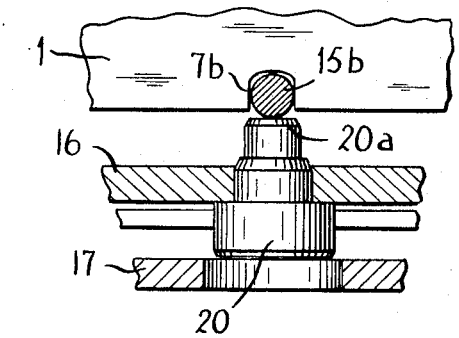
FIG. 8 is a fragmentary section view taken along section line 8—8 of FIG. 6.
Figure 4:
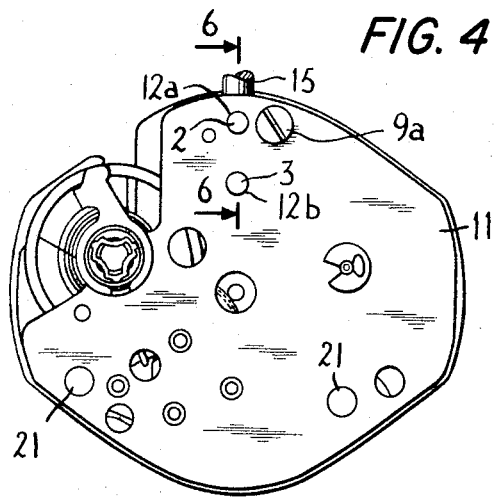
FIG. 4 is a plan view of a winding stem bearing assembly according to the invention.

8. The bearing pin 20 for the winding stem 15 is inserted through an access opening the third plate 17 and pressed into an opening in the second plate 16 so that its bearing end portion 20a contacts the winding stem 15 as shown in FIG. 8 and provides a bearing surface therefor.

What we claim and desire to secure by Letters Patent is:

1. A winding stem bearing assembly for use in a watch comprising, an integral bearing block having an elongated cavity having axial sections of different transverse dimensions and communicating with exterior surfaces of said bearing block, a winding stem having a plurality of axial portions of different transverse and axial dimensions disposed rotatably supported in corresponding sections of said elongated cavity and extending axially outwardly thereof, said bearing block having a second cavity transverse to the first-mentioned cavity and in communication therewith and with the exterior of said bearing block, a pinion disposed circumferentially of a portion of said winding stem for rotation therewith disposed in said second cavity, a tapered cavity in said bearing block, a tapered setting lever pin in said tapered cavity, a bearing pin extending axially into a section of the first-mentioned cavity bearing a portion of said winding stem having a smallest transverse dimension, a bridge fixed on a side of said bearing block, a plate fixed on a side of said bearing block opposite to that on which said bridge is mounted supporting an axial portion of said winding stem of greater transverse dimension than the portion of smallest transverse dimension.

2. A winding stem bearing assembly for use in a watch according to claim 1, in which said bearing block is an integral molded unit made of plastic.

3. A winding stem bearing assembly for use in a watch according to claim 1, in which said winding stem extends axially in an axial direction corresponding to a general direction in which said bridge and plate extend.

4. A winding stem bearing assembly for use in a watch according to claim 1, in which said pinion has an opening therethrough and said winding stem extends axially through said opening and means on said pinion and winding stem having complementary coupling surfaces.

5. A winding stem bearing assembly for use in a watch according to claim 1, in which said bearing block has projections on a side on which said bridge is disposed for locating the bridge on said bearing block.

6. A winding stem bearing assembly according to claim 1, in which said winding stem has a portion having a major diameter and a collar spaced axially therefrom, a setting lever held fixed relative to said vearing block having a bent portion disposed between said collar and said portion having a major diameter holding said winding stem axially within said elongated cavity.

* * * * *